(12) United States Patent
Pieper et al.

(10) Patent No.: US 6,675,374 B2
(45) Date of Patent: *Jan. 6, 2004

(54) INSERTION OF PREFETCH INSTRUCTIONS INTO COMPUTER PROGRAM CODE

(75) Inventors: John Samuel Pieper, Mont Vernon, NH (US); Steven Orodon Hobbs, Westford, MA (US); Stephen Corridon Root, Westboro, MA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,436

(22) Filed: Oct. 12, 1999

(65) Prior Publication Data

US 2003/0005419 A1 Jan. 2, 2003

(51) Int. Cl.[7] .................................................. G06F 9/45
(52) U.S. Cl. ...................... 717/141; 717/131; 717/142; 717/154; 712/235; 712/237
(58) Field of Search ...................... 717/4–9, 140–143, 717/150–151, 158, 235–338, 154–169; 712/235–138

(56) References Cited

U.S. PATENT DOCUMENTS

| | | | |
|---|---|---|---|
| 4,590,550 A | 5/1986 | Eilert et al. ................. | 364/200 |
| 4,656,582 A | 4/1987 | Chaitin et al. .............. | 364/300 |
| 4,656,682 A | 4/1987 | DeFelice et al. ............. | 5/494 |
| 4,821,178 A | 4/1989 | Levin et al. ................ | 364/200 |
| 4,845,615 A | 7/1989 | Blasciak .................... | 364/200 |
| 5,103,394 A | 4/1992 | Blasciak .................... | 395/575 |
| 5,151,981 A | 9/1992 | Westcott et al. ............. | 395/375 |
| 5,193,190 A | 3/1993 | Janczyn et al. ............. | 395/700 |
| 5,202,995 A | 4/1993 | O'Brien ..................... | 395/700 |
| 5,212,794 A | 5/1993 | Pettis et al. ................ | 395/700 |
| 5,303,377 A | 4/1994 | Gupta et al. ................ | 395/700 |
| 5,446,876 A | 8/1995 | Levine et al. .......... | 395/184.01 |
| 5,450,586 A | 9/1995 | Kuzara et al. ............. | 395/700 |
| 5,457,799 A | 10/1995 | Srivastava ................. | 395/700 |

(List continued on next page.)

OTHER PUBLICATIONS

Design and Evaluation of a Compiler Algorithm for Prefetching, Todd, C. Mowry.© 1992, ACM.*
Abraham, et al., *Predicting Load Latencies Using Cache Profiling*, Hewlett Packard, Nov., 1994, pp. 1–39.
Anderson, et al., *Continuous Profiling: Where Have All the Cycles Gone?*, Copyright 1997.
Ball, et al., *Efficient Path Profiling*, IEEE, Dec., 1996, pp. 1–12.
Bershad, et al., *Avoiding Conflict Misses Dynamically in Large Direct–Mapped Caches*.
Cohn, et al., *Hot Cold Optimization of Large Windows/NT Applications*, copyright 1996, IEEE, pp. 1–10.
Conte, et al., *Using Branch Handling Hardware to Support Profile–Driven Optimization*, 1994, pp. 1–11.
Conte, et al., *Accurate and Practical Profile–Driven Compilation Using the Profile Buffer*.

(List continued on next page.)

*Primary Examiner*—Tuan Q. Dam
*Assistant Examiner*—Chuck Kendall

(57) ABSTRACT

A technique is provided for inserting memory prefetch instructions only at appropriate locations in program code. The instructions are inserted into the program code such that, when the code is executed, the speed and efficiency of execution of the code may be improved, cache conflicts arising from execution of the prefetch instruction may be substantially eliminated, and the number of simultaneously-executing memory prefetch operations may be limited to prevent stalling and/or overtaxing of the processor executing the code.

63 Claims, 5 Drawing Sheets

U.S. PATENT DOCUMENTS

| | | | | |
|---|---|---|---|---|
| 5,475,823 | A | 12/1995 | Amerson et al. | 395/496 |
| 5,479,652 | A | 12/1995 | Dreyer et al. | 395/183.06 |
| 5,485,574 | A | 1/1996 | Bolosky et al. | 395/183.11 |
| 5,493,673 | A | 2/1996 | Rindos, III et al. | 395/550 |
| 5,524,263 | A | 6/1996 | Griffth et al. | 395/800 |
| 5,528,753 | A | 6/1996 | Fortin | 395/183.11 |
| 5,537,541 | A | 7/1996 | Wibecan | 395/183.21 |
| 5,572,672 | A | 11/1996 | Dewitt et al. | 395/184.01 |
| 5,581,482 | A | 12/1996 | Wiedenman et al. | 364/551.01 |
| 5,651,112 | A | 7/1997 | Matsuno et al. | 395/184.01 |
| 5,694,568 | A * | 12/1997 | Harrison, III et al. | 717/161 |
| 5,704,053 | A * | 12/1997 | Santhanam | 717/7 |
| 5,710,912 | A | 1/1998 | Schlansker et al. | 395/561 |
| 5,715,425 | A | 2/1998 | Goldman et al. | 395/445 |
| 5,734,856 | A | 3/1998 | Wang | 395/395 |
| 5,761,468 | A | 6/1998 | Emberson | 395/383 |
| 5,797,013 | A * | 8/1998 | Mahadevan et al. | 717/9 |
| 5,854,934 | A * | 12/1998 | Hsu et al. | 717/7 |
| 5,933,643 | A * | 8/1999 | Holler | 717/158 |
| 5,950,007 | A * | 9/1999 | Nishiyama et al. | 717/7 |
| 5,964,867 | A | 10/1999 | Anderson et al. | 712/219 |
| 6,195,748 | B1 * | 2/2001 | Chrysos et al. | 712/227 |

OTHER PUBLICATIONS

Fisher, Joseph, *Global Code Generation For Instruction–Level Parrallelism: Trace Scheduling–2*, Jun., 1993, pp. 1–24.

Horowitz, et al., *Informing Memory Operations: Providing Memory Performance Feedback in Modern Processors*, May, 1996, pp. 1–11.

Hwu, et al., *The Superblock: An Effective Technique for VLIW and Superscale Compilation*, 1993, pp. 1–24.

Romer, et al., *Dynamic Page Mapping Policies for Cache Conflict Resolution on Standard Hardware*, Nov., 1994.

Romer, et al., *Reducing TLB and Memory Overhead Using Online Superpage Promotion*, 1995.

*Exploiting Choice: Instruction Fetch and Issue on an Implementable Simultaneous Multithreading Processor*, May, 1996.

Tullsen, et al., *Simultaneous Multithreading: Maximizing On–Chip Parrallelism*, Jun., 1995.

Ben Verghese, et al., *Operating System Support for Improving Data Locality on CC–NUMA Compute Servers*.

Young, et al., *Improving the Accuracy of Static Branch Prediction Using Branch Correlation*, Oct., 1994, pp. 1–10.

Horowitz, et al., *Fundamentals of Data Structures in Pascal*, Copyright 1984, Computer Science Press, Inc.

Blickstein, et al., *The GEM Optimizing Compiler System*, Sep. 1992, pp. 121–136.

Mowry, et al., *Design and Evaluation of a Compiler Algorithm for Prefetching*, 1992, pp. 62–73.

McIntosh, *Compiler Support for Software Prefetching*, May, 1998, pp. 1–158.

Mowry, *Tolerating Latency Through Soft–Ware–Controlled Data Prefetching*, Mar., 1994, pp. 1–202.

* cited by examiner

INSERTION OF PREFETCH INSTRUCTIONS INTO COMPUTER PROGRAM CODE

BACKGROUND OF THE INVENTION

1. Field of the Invention

The present invention relates to a technique for inserting memory prefetch instructions (e.g., instructions that prefetch data into a processor's on-chip cache memory from off-chip main memory) into computer-executable program code, and more specifically, to such a technique wherein the prefetch instructions may be inserted into the program code in such a way as to improve efficiency and speed of execution of the code, avoid both cache memory conflicts and the overtaxing of processor resources, and reduce program execution inefficiencies (e.g., stalling of program execution by the processor) that can result if the data required by the processor to execute the code is not present in the cache memory when needed by the processor. Although the present invention will be described in connection with embodiments that are particularly well suited to use in connection with inserting of prefetch instructions into program code having one or more program loops in which memory array accesses are present, it will be appreciated that the present invention also may be advantageously used to insert such instructions into other types of program code.

2. Brief Description of Related Prior Art

As computer processors have increased their processing speeds, main computer memory systems have lagged behind. As a result, the speed of the computer system's main memory can be the limiting factor in the speed of execution of application programs by the computer system, particularly in the case of programs that manipulate large data structures (e.g., large arrays stored in memory, such as those needed in scientific and engineering programs). More specifically, when data stored in main memory is required by the computer system's processor to execute a given program, latency in transferring that data from the main memory to the processor may reduce the speed with which the processor may execute the program.

In order to try to increase program execution speed and reduce the aforesaid type of data transfer latency, in many conventional computer systems, the processor is used in conjunction with an associated high-speed cache memory. Typically, when the processor is implemented in a microprocessor integrated circuit chip, this cache memory is comprised in same chip as the processor. In such processors, when the data contained in the cache is accessed by the processor, that memory operation may stay on-chip (i.e., within the processor chip); such on-chip memory operations may be orders of magnitude faster to execute than similar memory operations that must access main memory.

In a further effort to increase program execution speed and efficiency, many conventional high-performance processors (e.g., the Alpha 21264™ microprocessor manufactured by, and commercially available from the Assignee of the subject application) have been configured to be able to issue instructions out-of-order, and to process certain instructions in parallel. By implementing these features in a given processor, the bandwidth of the processor's program instruction throughput may be increased. However, in a sequence of program instructions there may be a so-called "critical path" of instructions that are dependent upon one another and cannot be issued in parallel. When such a critical path exists in a given set of program instructions, the execution time of the instructions tends to approach the latency of execution of the critical path. In some important types of application programs (e.g., scientific and engineering application programs), memory operations comprise a significant portion of the total instructions in the programs' respective critical paths.

By appropriately inserting prefetch instructions into a program, the time required for the processor to execute the program's critical path can be decreased. That is, by inserting prefetch instructions, at appropriate places in the program prior to the point in the program where the data being prefetched by the prefetch instructions is required by the processor, the time required to execute the program's critical path of instructions may be reduced, by enabling the prefetched data to be in the cache and available to the processor at or near the time when it will be needed by the processor. This can improve the program's efficiency and speed of execution.

Further problems, in the form of cache conflicts, can arise if both the timing of data prefetching, during execution of the program, is not carefully managed to avoid such conflicts and, when the data is prefetched, it is transferred from the main memory to a cache memory that is not fully associative. That is, when such a cache memory is used, depending upon the timing of prefetching, and the address in main memory of the newly prefetched data, the newly prefetched data may displace (i.e., overwrite) useful data previously stored in the cache just prior to the processor requesting the useful data. When the processor references (e.g., requests) the useful data after it has been displaced from the cache, a cache miss occurs. This, in turn, causes retrieval from the main memory of the previously-displaced useful data, which is again stored in the cache, thereby displacing the data that previously displaced the useful data. The operations involved with this type of cache conflict problem are wasteful as they increase the time that it takes the processor to be able to use the useful data, and also consumes memory system bandwidth.

Computer programmers typically develop computer programs for conventional processors using relatively high-level source code computer languages (e.g., C++, Pascal, Fortran, etc.). This is because programmers often find developing computer software using such high-level languages to be much easier than developing the software using relatively low-level languages (e.g., assembly and machine language code). Compilation programs (e.g., compilers, linkers, assemblers, etc.) are typically used to translate or convert the source code developed by a programmer into a machine-executable form or image code for execution by the target processor. The compilation programs often implement processes (hereinafter "optimization processes") that structure and generate the machine-executable code in such a way as to try to ensure that the execution of the machine-executable code by the target processor consumes a minimum amount of resources of the target computer system.

One such conventional optimization process is disclosed in U.S. Pat. No. 5,704,053 to Santhanam. The optimization process described in Santhanam involves inserting prefetch instructions that prefetch array accesses in scientific application program loops. This patent also describes performing reuse analysis using only subscript expression analysis, where previous methods had relied on dependence analysis. The patent also describes generating and inserting prefetch instructions, and taking into account reuse of data, to eliminate unnecessary prefetch instructions. Santhanam also teaches determining a "prefetch distance" (i.e., in essence, a time interval between the beginning of execution of the prefetch instruction and the expected time that the processor will require the data being prefetched by the instruction) that is used to calculate where in the program to insert the prefetch instruction. It is said that the prefetch distance may be calculated in terms of a number of loop iterations, in advance of the expected time that the processor will require the prefetched data.

Santhanam nowhere discloses or suggests employing any kind of cache conflict analysis when determining whether and where to insert a prefetch instruction. Thus, disadvantageously, Santhanam's disclosed optimization process is unable to prevent cache conflict problems, of the type described above, from occurring during execution of the machine code generated by that process. Santhanam also nowhere discloses or suggests generating the machine-executable code in such a way that the number of simultaneously executing memory operations is limited to prevent stalling and/or overtaxing of the processor.

Other conventional optimization processes are disclosed in e.g., "Compilation-Based Prefetching For Memory Latency Tolerance," Ph.D. Thesis of Charles W. Selvidge, MIT/LCS/TR-547, Laboratory For Computer Science, Massachusetts Institute of Technology, Cambridge, Mass., 1992; "The GEM Optimizing Compiler System," *Digital Technical Journal, Volume 4. Number 4, Special Issue,* 1992, pp. 121–136; "Compiler Support For Software Prefetching," the Ph.D. Thesis of Nathaniel McIntosh, Rice University, Houston, Tex. 1998; and "Tolerating Latency Through Software-Controlled Data Prefetching", the Ph.D. Thesis of Todd Mowry, Stanford University, Palo Alto, Calif., 1994. Unfortunately, these conventional optimization processes suffer from the aforesaid and/or other disadvantages and drawbacks of the optimization process disclosed in Santhanam.

SUMMARY OF THE INVENTION

We think that perhaps the best way to think about prefetch instructions, is that they provide a means for keeping the memory system closer to full utilization. For example, consider first a non-optimally compiled program executed on an in-order processor, in which a load instruction is to be executed followed by an instruction that uses the variable value being loaded. If the load instruction results in a memory miss, there may be a processor stall of several dozen cycles between the load and its usage. From the viewpoint of the memory system, this program is inefficient. The memory system, which could be operating on multiple simultaneous requests, is processing only one at a time, because the stalls are preventing the launching of the next memory transaction. Further, there may be turn-around delays associated with having each new memory access request launched after the previous one is completed.

In another example, a program may be compiled such that several load instructions are executed prior to usage of the loaded variable values to improve program execution efficiency. Alternatively, out-of-order execution may be used to accomplish the same improvement, (i.e., by running ahead of the stalled instruction to find more load instructions to issue.)

While this second example results in greater execution efficiency than the first, it still falls far short of utilizing the memory system in an optimal fashion. The problem is the very high latency that results from memory misses.

The key to properly understanding the use of the prefetch instruction is that the desired data motion from memory to the on-chip cache can be initiated far ahead of the time when the results of the prefetch are required, without being tied to a register (either architectural, or remap for out-of-order). Further, a prefetch instruction can be "retired" long before that data motion is completed. Also, errors such as an "out-of-bounds" reference can simply be dismissed, as they should not be considered truly problematic errors.

The prior art does not properly consider a key question in inserting prefetch instructions: how far ahead of when their results are required should they be executed? It is our strong contention that this consideration is not properly made in terms of execution times, which the compiler cannot know accurately. It is our contention that this consideration should be made in terms of the cache memory itself (i.e., how many cache lines ahead to prefetch, to match the simultaneous request capability of the memory system). According to our new paradigm, prefetches should be placed in the code stream so as to keep the memory system, as much as possible, fully utilized.

The Alpha 21264TM processor dismisses prefetch instructions that hit in the on-chip cache with a small amount of overhead. Therefore, it is best that program code for that processor be fitted with-prefetch instructions, unless it is conclusively known that the incoming data will reside in the on-chip cache. The inventive strategy presented herein is also appropriate for data that resides in a board level cache, operating at a latency between that of the on-chip cache, and the memory. Indeed, this consideration of a third level of the memory system shows the basic flaw of considering where to insert prefetches in terms of time rather than cache memory lines. A given program will very likely run at different speeds (different inner loop times) depending on which level of the memory system holds its data.

A technique is provided in accordance with the present invention for inserting one or more prefetch instructions into executable program code instructions that overcomes the aforesaid and other disadvantages and drawbacks of the prior art. One embodiment of the present invention is employed to advantage in a computerized program code compilation system. In this system, a first set of computer program instructions in a relatively higher level program instruction language is converted by compilation processes, resident in memory in the system, into a second set of computer program instructions in a relatively lower level program instruction language.

The compilation processes include one or more optimization processes, and among the optimization processes is a process that determines whether and where in the second set of instructions to insert memory prefetch instructions. More specifically, this latter process decides whether to insert a prefetch instruction at a given location in the second set of instruction based upon a number of factors. Among these factors is a determination as to whether the insertion of the prefetch instruction at this location will cause an undesired cache memory conflict when and if the prefetch instruction is executed. Also among these factors is a determination as to whether the insertion of the prefetch instruction at the location will cause, when executed by the processor, the number of memory operations being simultaneously executed by the processor to become excessive (i.e., such that the processor's available resources are likely to be overtaxed and/or the processor is likely to stall). Based upon these factors, the latter process may then decide whether and where in the second set of instructions to insert prefetch instructions, and this process (or another process among the optimization processes, e.g., a loop unrolling process) may place prefetch instructions into the second set of instructions in accordance with this decision.

Thus, the present invention facilitates efficient insertion of prefetch instructions into application programs, which advantageously may take place during compilation of such programs. During this compilation process, the prefetch instructions may be explicitly inserted into an intermediate level, machine-independent code that is first generated by the process from the input source code. A later machine code-generation process may then translate/convert the intermediate level code, including the prefetch instructions, into machine-specific program instructions that are intended to be executed by the target processor.

Advantageously, in the prefetch instruction insertion technique of the present invention, the prefetch instructions are inserted into the program code such that, when the code is executed, the speed and efficiency of execution of the code may be improved, cache conflicts arising from execution of the prefetch instruction may be substantially eliminated, and the number of simultaneously-executing memory prefetch operations may be limited to prevent stalling and/or overtaxing of the processor.

These and other features and advantages of the present invention will become apparent as the following Detailed Description proceeds and upon reference to the Drawings, wherein like numerals depict like parts, and in which:

Although the following Detailed Description will proceed with reference being made to illustrative embodiments and methods of use, it should be understood that the present invention is not intended to be limited to these embodiments and methods of use. Rather, the present invention should be viewed broadly, as being of broad scope limited only as set forth in the hereinafter appended claims.

DETAILED DESCRIPTION OF ILLUSTRATIVE EMBODIMENTS

Figure 1:
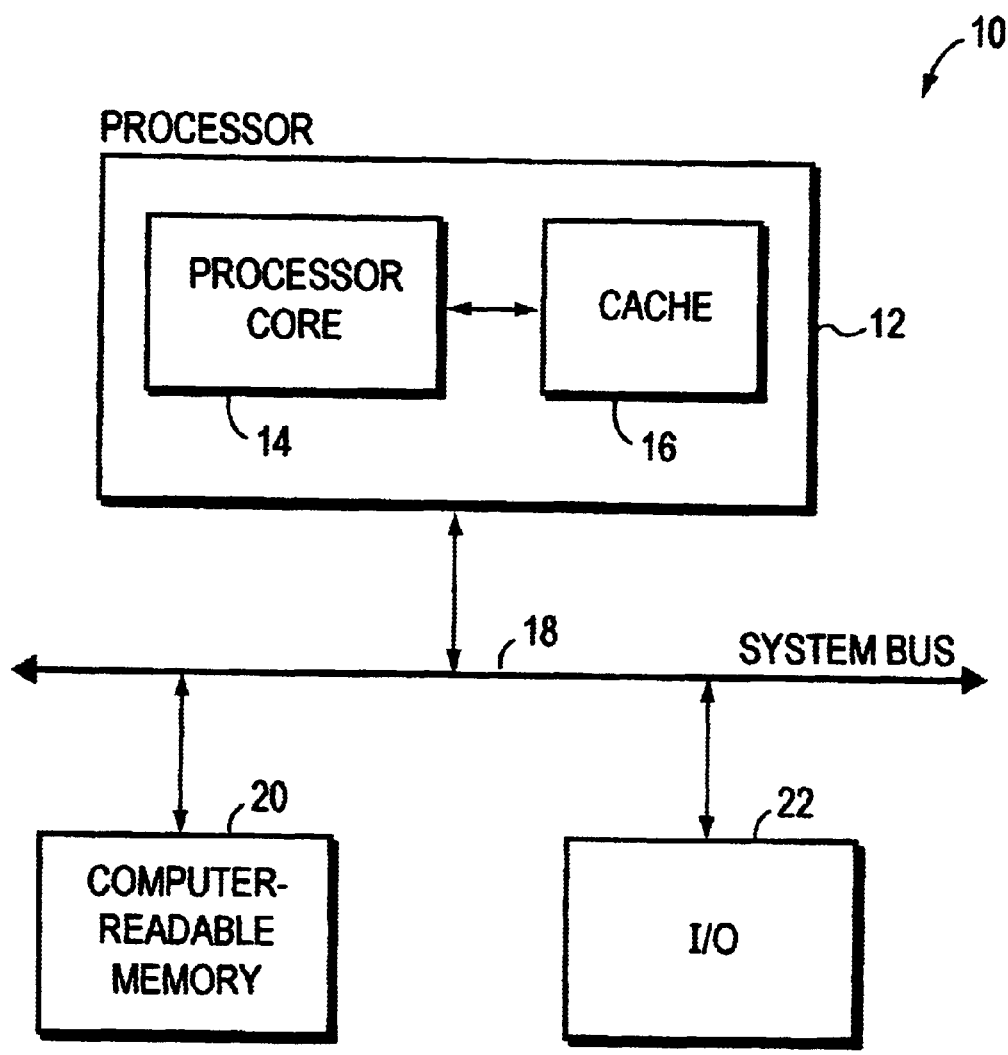
FIG. 1 is a schematic block diagram of a computer system wherein one embodiment of the technique of the present invention is advantageously practiced. This system can execute computer program processes. These processes may include prefetch operations and, in addition, one of the processes can be the computer program code compilation processes of FIG. 2.

With reference being made to FIGS. 1–5, one embodiment of the technique of the present invention will now be described, in connection with its implementation by processes 50 implemented by computer system 10. In general, as is shown in FIG. 1, system 10 comprises computer-readable memory 20 for storing software programs, algorithms, and data structures associated with, and for carrying out, the various processes which reside in memory 20 and use the inventive prefetch insertion and optimization processes, and related and other methods and techniques described herein. In addition, system 10 further includes processor 12 (e.g., an Alpha 21264™ microprocessor) which comprises a processor core 14 for executing these software programs and algorithms, and for manipulating the stored data structures, to enable the system 10 to carry out these methods and techniques. In system 10, processor 12 is implemented as a single integrated circuit chip, and in addition to core 14, also comprises an associated cache memory 16. System 10 may also include a conventional input/output interface 22 (e.g., comprising keyboard, pointing device, display terminal, etc.) for permitting a user to control and interact with the system 10. The processor 12, memory 20, and interface 22 are interconnected by a system bus 18.

Figure 2:
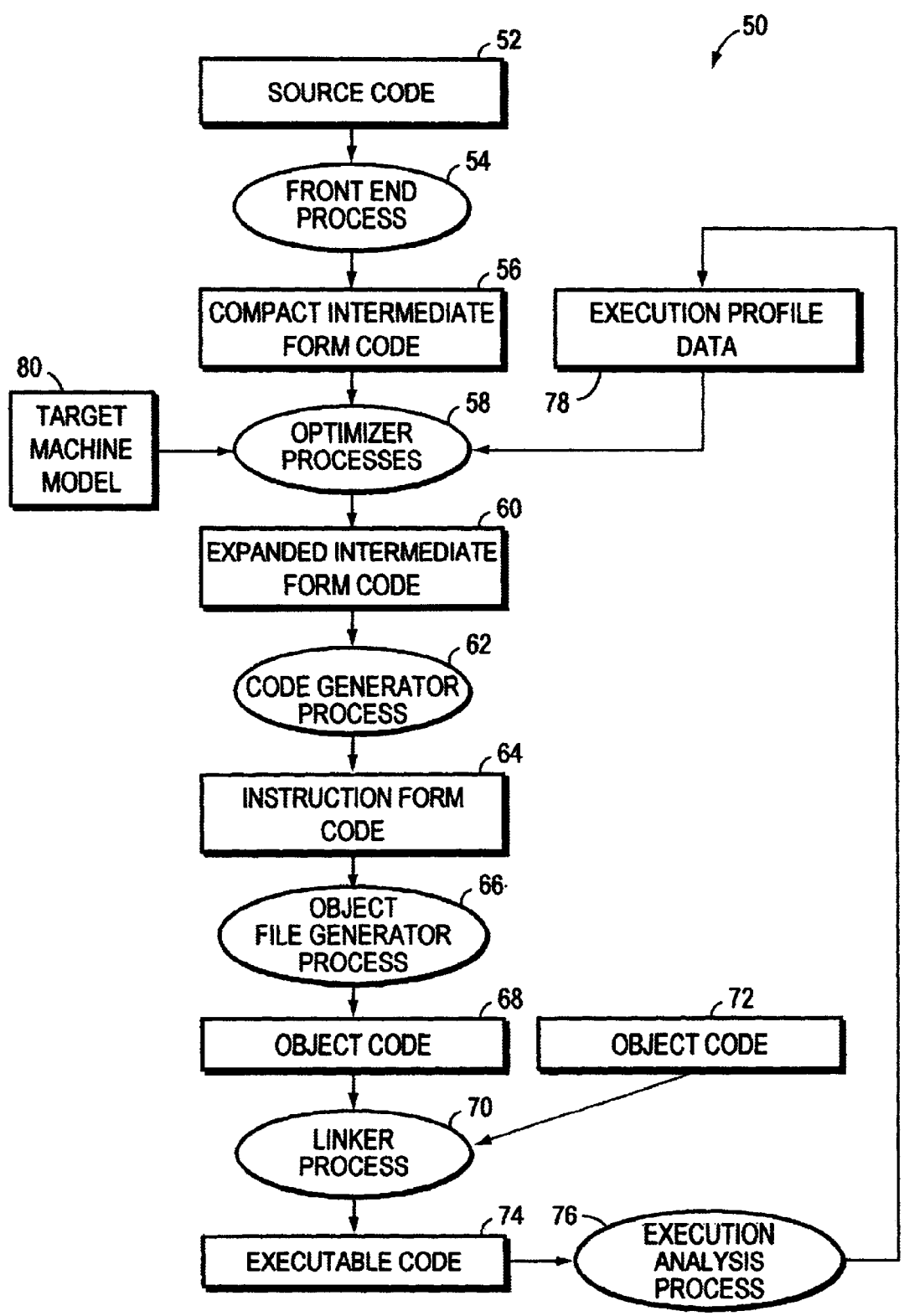
FIG. 2 is a flowchart illustrating computer program code compilation processes implemented by the system of FIG. 1, and wherein one embodiment of the technique of the present invention is advantageously practiced.

FIG. 2 is a flowchart illustrating the sequence of compilation procedures 50 applied to relatively higher level source code 52 to compile it into relatively low level executable machine code 74 in the system 10, as well as the beginning and/or intermediate products produced by and/or input to procedures 50. It should be noted at the outset of the discussion of FIG. 2 that procedures 50 are not limited to being practiced on the same system 10 in which code 74 is run. Rather, procedures 50 may be practiced on a different computer system and the code 74 may be executed on computer system 10, or vice versa. In the compilation sequence 50, the first process to be applied to the source code is front end process 54. Using conventional techniques, front end process 54 translates source code 52 into a compact intermediate form 56. Code 56 is then processed by optimization processes 58. This processing of code 56 by processes 58 will be described in greater detail below, but in general, processes 58 expand code 56 into an expanded intermediate form 60 that is suitable for processing by a conventional code generator process 62, and in doing so, transform the instructions and structure of code 56 so as to provide a more efficient code 60. The code 60 output by the optimization processes 58 is in an intermediate level program code language that is substantially independent of the architecture of the target processor 12. The optimization processes perform this transformation of code 56 based upon, among other things, execution profile data 78 generated by execution analysis process 76.

In essence, process 76 generates data 78 by initially executing code 74 using system 10, and then observing and analyzing the manner in which that code 78 uses resources (e.g., processor 14, cache 12, and main memory 20, and components thereof) in system 10 when it is initially executing. Process 76 then generates execution profile data 78 that represents the results of its observations and analysis of execution of code 74. The optimization processes 58 then use the data 78 to generate a new, more efficient version of form 60 which then is processed by the other processes in sequence 50 (which other processes will be described below) to generate a new, more efficient version of code 74. This new version of code 74 may then be executed, and its execution may be observed and analyzed by process 76 to generate new profile data 78. The new profile data 78 may then be used by the processes 58, in the manner described previously, to generate a further version of form 60 that may be more efficient than the previous version of form 60. Code generator process 62 translates the expanded intermediate code 60 into instructions 64 that are specific to the architecture of the target processor 12. In generating the code 64, generator 62 modifies the code 60 such that code 64 reflects scheduling and other low-level optimizations of the code 60, which are dependent on the target processor architecture.

Object code 68 is then generated by a conventional process 66 from the code 64. Conventional linker 70 then combines object code 68 with other object code 72 (e.g., from library object code) to produce machine-dependent code 74 that is executable by the system 10. As discussed previously, the executable code 74 is executed by process 76 to generate execution profile data 78 that is used by the processes 58 to determine whether the code 74, when executed, exhibits optimal execution performance, and if code 74 does not exhibit optimal execution performance, may be used by the processes 58 make more is optimal versions of the code 60 from which more optimal versions of code 74 may be generated.

Figure 3:
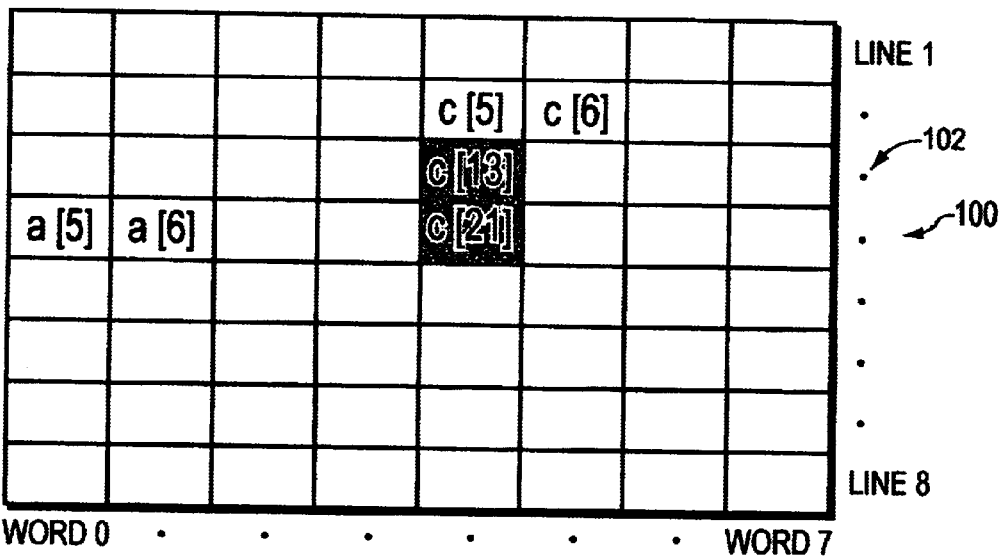
FIG. 3 is a schematic representation of a set-associative data cache comprised in the system of FIG. 1.
Figure 3:
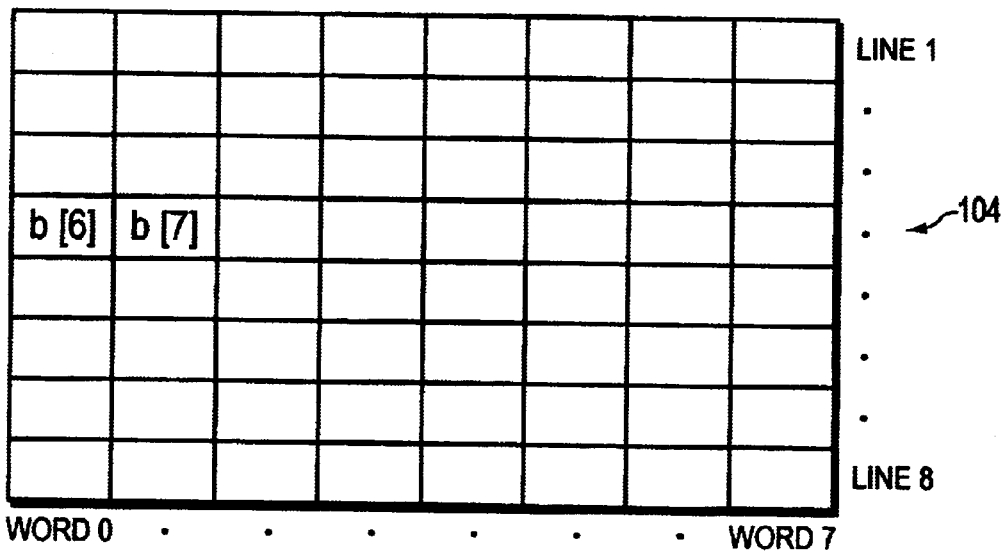
Figure 4:
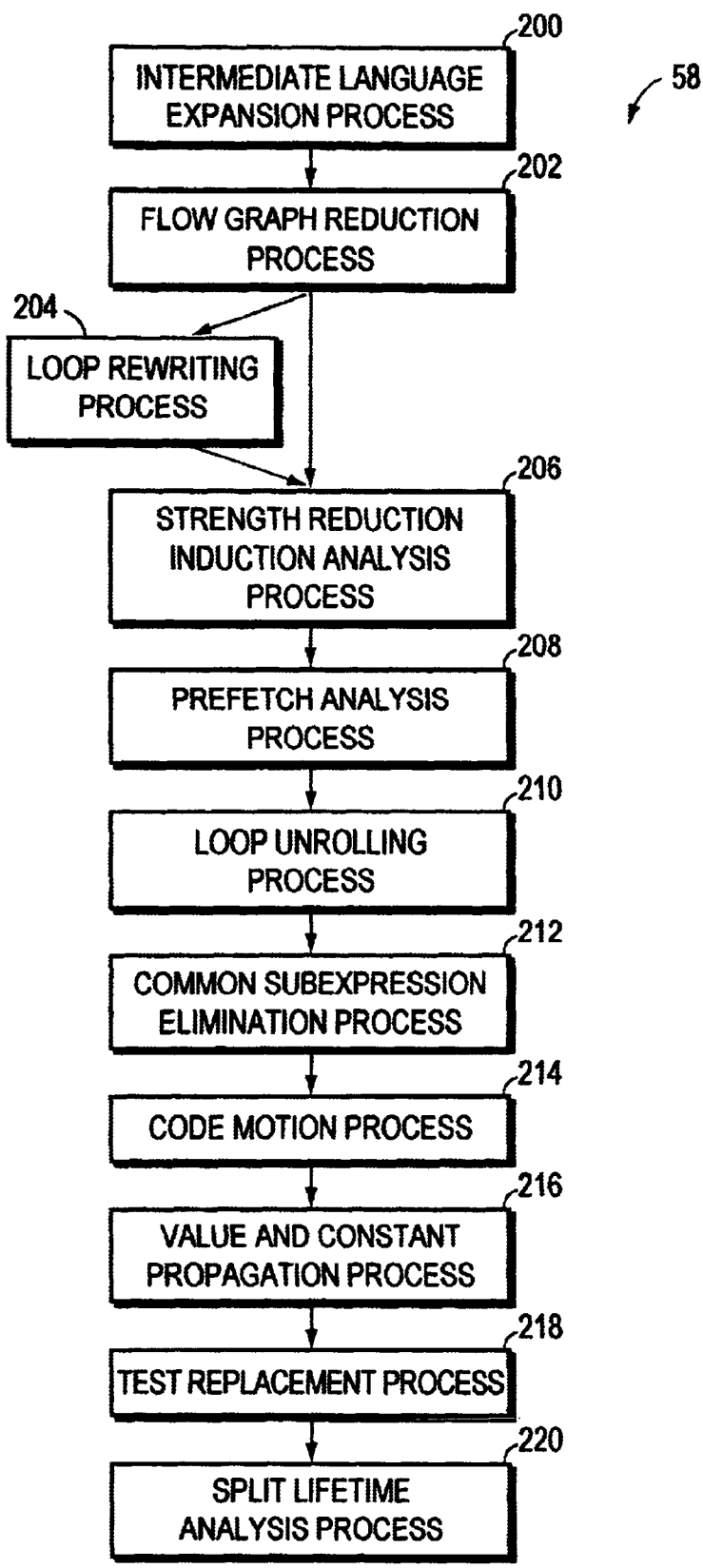
FIG. 4 is a flowchart illustrating in greater detail the optimization processes of FIG. 2.
Figure 5:
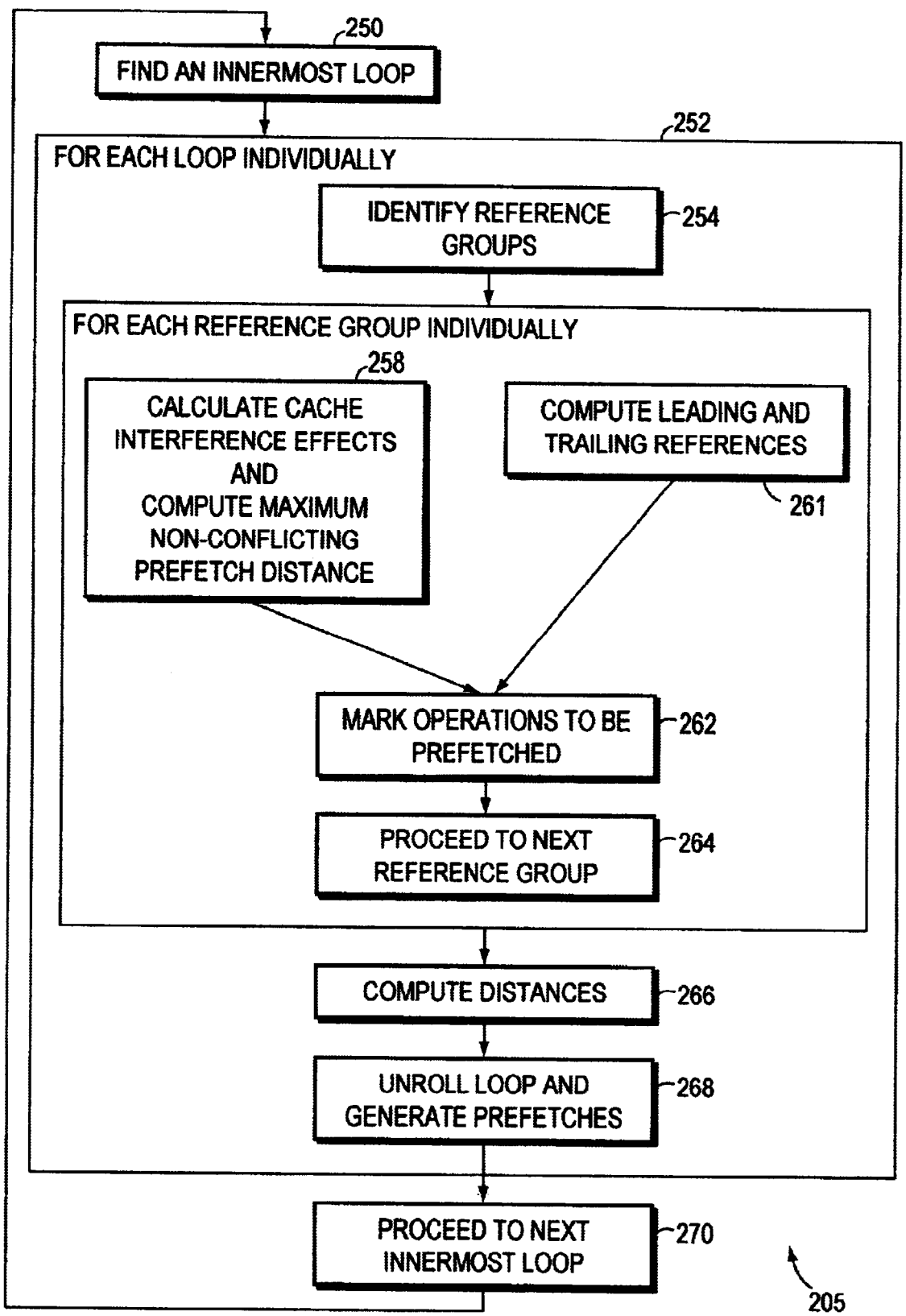
FIG. 5 is a flowchart illustrating in greater detail the prefetch insertion analysis and loop unrolling process comprised in the processes of FIG. 4.

With particular reference being made to FIGS. 3–5, the function and operation of the optimization processes 58 will be described in connection with the compiling of a source code program 52, which program 52 for purposes of illustration is assumed to comprise program loops. The sequence of operations in a program loop is predictable because, by definition, the same set of operations is repeated for each iteration of execution of the loop.

Each loop that is subject to the insertion of prefetch instructions has an associated index variable that is incremented by a constant amount in each loop iteration, until some final value of the index variable is reached, at which point the loop is terminated. In scientific programs, it is common for the index variable also to be used in memory references that address elements of large arrays (e.g., that contain scientific data to be manipulated or processed). Typically, such memory array references can give rise to a significant proportion of cache misses.

An array reference that has a subscript expression that is a linear function of a loop index variable will result in accesses being made to a linear sequence of memory locations. In such situations, the difference in the subscript expression computed in one iteration of the loop and that computed in an immediately preceding iteration of that loop is termed the "stride" of the array reference. In order to make clearer this concept, the following pseudo-source code-like example is presented:

```
i = 1;
LOOP
    a[i] = b[i + 1] + c[i];
    i = i + 1;
END_LOOP
```

In the above example, each time the index variable i changes by one, the address accessed by the expression b[i+1] changes by the size of one element of the array b. If the size of one element in the example is four bytes, then the stride of that reference is four bytes. Array reference a[i] has the same stride as b[i+1] if arrays a and b each have the same element size.

It is instructive at this point to consider how data is loaded and stored into cache 16, and how cache conflicts in cache 16 can arise. For purposes of this discussion, cache 16 may be assumed to be a two-way set associative data cache, with each set containing eight cache lines, and each line holding eight data words. The logical layout 100 of cache 16 is shown in FIG. 3.

For purposes of this discussion, each array element referenced in the above example may be considered to be one data word in length, and the starting addresses of arrays a, b, and c in memory 20 are such that when loaded into cache 16, array a starts in line 3 at word 4 in layout 100, array b starts in line 3 at word 3 in layout 100, and array c starts in line 2 at word 0 of layout 100, respectively. Given these assumptions, the relative locations of accessed elements of arrays a, b, c, when the index variable i has the values 5 and 6 and these elements are stored in cache 16, are shown in unshaded blocks labeled c[5], c[6], a[5], a[6], b[6], b[7] in the layout 100 of FIG. 3.

As will be appreciated by those skilled in the art, in set-associative cache 16, there are only a fixed number of locations where a given data word from memory 20 is allowed to reside. The line number of the given word in cache 16 is a fixed function of the address in memory 20 of the given word. Conversely, the set number is not a fixed function of that address, and therefore, a data word to be stored in cache 16 may be assigned to either set 1 or 2, although all words in the same line must be stored in the same set. In this example, the elements of array a in cache 16 have been allocated into set 1 (which has been assigned reference numeral 102 in FIG. 3). In order to avoid a conflict with the elements of array a, since the elements of array b need to be in the same line as those of the elements of array a, they cannot go into set 1, and have been instead allocated into set 2 (which has been assigned to numeral 104 in FIG. 3). Elements 5 and 6 of array c have been allocated to set 1.

For purposes of this example, let us assume that during the compilation process, prefetch instructions are inserted into the code of this example to prefetch the reference to c[i], and let us also assume that the memory latency and the time required to execute one loop iteration are such that the optimal prefetch distance is 16 words ahead. Therefore, given that this prefetch distance is two cache lines (i.e., 16 words), the prefetched data must be stored into line 4, as shown by the shaded location of c[21] in the layout 100 FIG. 3. However, this prefetched data cannot be stored in set 1, because the currently accessed elements of array a are stored in set 1. Likewise, the prefetched data cannot be stored into set 2, because the currently accessed elements of array b are stored in set 2. In this situation, a cache conflict exists, as there is no location in cache 16 in which the prefetched data can be stored without overwriting useful data (i.e., the data elements of arrays a and b that are currently being accessed).

Advantageously, in accordance with the present invention, this type of potential cache conflict behavior that can be engendered by use of prefetch instructions is detected and prevented. In the embodiment of the present invention that is implemented in system 10, in-essence, this is accomplished during compilation of source code 52 by first locating and analyzing groups of memory operations in the code that have a predetermined common relationship that will be described below. However, prior to proceeding with describing the particulars of this relationship and how it is used in eliminating this type of potential cache conflict behavior, it is useful to define terminology that will be used in such description:

A "reference group" is defined herein to be a set of array references in a loop that have the same stride and a known constant offset from each another. A "leading reference" is defined herein to be the reference in a respective reference group that, regardless of cache alignment, is always the first reference to cause the data it accesses to be stored in a location in cache 16 that is associated with a given cache line. Any reference in a respective reference group that is not a leading reference for that group is said to be a "trailing reference".

It is also important to note for purposes of the present discussion that array elements may have known offsets from each other even if their absolute memory addresses (i.e., in memory 20) are not known. For example, in the FORTRAN language a common block may be defined that requires data within the block to be contiguous. If such a common block is so defined, and the size and types of variables within the block are also known, it is possible to know the respective starting addresses of the respective variables in the block relative to each other. Likewise, if the dimensions of an array are known, it is also possible to compute the respective memory offsets between respective elements in the array, if the respective elements' array references are known.

Moving on from the foregoing, optimization processes 58 will now be described in greater detail with reference being made to FIGS. 4–5. As shown in FIG. 4, the first of processes 58 is an intermediate language expansion process 200, which process 200 utilizes conventional techniques to translate code 56 into an expanded intermediate code representation there of suited for use by flow graph reduction process 202.

The first time the code generated by process 200 is analyzed by process 202, process 202 uses conventional techniques to construct a flow graph representation of the functions, operation, and program flow of the intermediate code generated by process 200. Using this flow graph representation and conventional program flow optimization techniques, the process 202 modifies the intermediate code representation provided by process 200 so as to optimize its program flow (e.g., redundant program branches and unnecessary program flow blocks embodied in the intermediate code representation may be deleted). Optionally, the resultant modified code may then be processed by a loop-rewriting process 204 that introduces certain conventional loop optimizations to the modified code (e.g., loop blocking, loop interchange, loop reversal, loop distribution, and/or loop fusion optimizations).

After being processed by process 204, or alternatively, even if the modified intermediate code representation does not undergo processing by process 204, after being processed by process 202, the code is processed by strength reduction induction analysis process 206. Using conventional techniques, process 206 identifies in the modified intermediate code induction variables, rewrites expressions, if possible, to use lower-strength operators, and identifies portions of the intermediate code having array accesses with subscripts that are linear functions of the index variable (termed "linear subscripts" hereinafter).

The code that results from this processing by process 206, and the identification of portions of the code having array accesses with linear subscripts are then supplied to prefetch analysis process 208, which examines the memory references in each program loop in that code and decides which memory references should be prefetched. Although FIG. 4 shows the process 208 and process 210 as being separate, in actual practice, processes 208 and 210 comprise a single process 205. The processing performed by process 205 is described below.

FIG. 4 also indicates that process 58 includes common expression elimination, code motion, value and constant propagation, test replacement, and split lifetime analysis processes 212, 214, 216, 218, and 220, respectively. These processes 212, 214, 216, 218, 220 are conventional, and therefore, will not be described herein. Also, it is important to note that, although not shown in FIG. 4, each of conventional processes 202, 206, 212, 214, 216, 218 and 220 may make use of the profile data 78 once it has been generated, to better carry out their respective optimizations.

With reference being made to FIG. 5, the process steps carried out by process 205 will now be described. The process 205 begins by identifying the inner-most loops in the code being processed (see block 250). For each respective loop in the intermediate code produced by the process 206, groups of array references sharing a common memory offset and having the same stride are then identified (see block 254), and two separate analyses are applied to each such array reference group so identified. One of the two analyses is a cache conflict analysis that determines, for each reference in the identified reference groups, the maximum prefetch distance that the reference can be prefetched without causing a cache conflict (See block 258). The other such analysis is reuse analysis that determines, among other things, leading and trailing references for each such identified reference group (See block 261). Based upon these two analyses, the leading references in each identified reference group with non-zero maximum distances are "marked" to be prefetched (See block 262). A respective prefetch distance for each reference to be prefetched is then calculated (see block 266), and prefetch instructions may then be inserted, into the code, in accordance with these calculations, by process 205 during loop unrolling (See blocks 266 and 268). Reuse analysis is described first herein.

An important part of prefetch analysis is determining those memory references that need not be prefetched. Knowing that a memory reference does not need to be prefetched permits the elimination of the unnecessary overhead that otherwise would result from execution of a unnecessary prefetch instruction. The principal technique used to tell which references do not need to be prefetched is reuse analysis.

In reuse analysis for a program executed in system 10, temporal and spatial locality inherent in the program are exploited. Locality is of importance in system 10 if it occurs with respect to references with the same stride in a given loop, because then such locality will occur on every iteration of the loop. Temporal locality exists when, during multiple loop iterations, the exact same main memory address is repeatedly referenced while the data of that address is still in the cache. Self-temporal locality exists when the same source reference is involved in multiple accesses in different loop iterations. Group-temporal locality is temporal locality that exists when more than one source reference is involved. Group-temporal locality may occur within one iteration,-or across iterations. Spatial locality is akin to temporal locality but occurs when the same cache line is repeatedly referenced, but not the same main memory location. Spatial locality can also be further categorized as self-spatial or group-spatial locality. Self-spatial locality is always across loop iterations, but group-spatial locality may occur on the same loop iteration as well. Reuse analysis for a program executed in system 10 can be understood as the analysis of respective reference groups to determine whether "locality" in a general sense based upon the above defined different types of locality is present.

Reuse analysis is performed for each reference group (see block 261). Reuse analysis is a two-step process. The first step is an initialization step, and the second step is the main analysis step. The first step in reuse analysis for a program executed in system 10 comprises sorting the array references according to their respective relative offsets. Since the sorting is based upon relative offsets, any reference can be chosen as a zero-point, and other references have their respective offsets computed relative thereto. The sort can be done using a conventional sort algorithm; in system 10 it is accomplished by inserting each reference into a B-tree. B-trees (also known as AVL-trees) are well-known (See chapter 19, section 2 of *Fundamentals of Data Structures in Pascal,* by Ellis Horowitz and Sartaj Sahni, copyright 1984, Computer Science Press, Inc., 11 Taft Court, Rockville, Md. 20850, ISBN 0-914894-94-3). Using a B-tree, the references are sorted and indexed, such that searching for references having given offsets using a B-tree takes a time that is proportional to log (n), where n is the number of references being sorted. This allows an efficient, unified algorithm to be used with both small-stride and large-stride references. The normal B-tree structure is augmented by a pointer-chain that allows the references to be "walked" in sorted order. A walk over the data in sorted order is used to insert these pointers, and to initialize a data structure describing each reference: each reference is initially marked as having no trailing references, and as being a leading reference. The largest offset encountered is remembered, since it is an upper bound on the searching that must be done (see below).

The second step of reuse analysis is to actually determine which references trail other references. In block 261, this is done in a second walk over the references in order from the reference with the most trailing offset to the references with the most leading offset. If the stride is positive, the most trailing offset is the numerically smallest and the most leading offset is the numerically largest. If the stride is negative the most leading offset is the numerically smallest and the most trailing offset is the numerically largest. For each reference, the set of offsets that a respective reference will access over time is computed by adding in successive multiples of the stride. The offsets thus computed are called induced offsets. From each induced offset, a "window" just less than one cache line wide is checked. If a reference is found with an offset in that window, then the first reference trails the reference which has an offset within the window. The data structure describing the trailing reference is modified to note that the reference is not a leading reference, and the trailing reference is added to the list of trailing references of the leader.

There is often significant overlap in the windows induced by adding a multiple of the stride, especially when the stride is small. The number of checks can be reduced by carefully considering this overlap. A simple way to remove redundant checks is to keep a lower bound and an upper bound on the range of offsets to be checked. The lower bound never needs to be smaller than the biggest offset we have already checked, nor smaller than the induced offset minus the length of one cache line. Similarly, the upper bound need not be larger than the minimum of the largest offset or one cache line higher than induced offset. If the stride is larger than a cache line, searching for the induced offset linearly takes a time that is proportional to n. The B-tree allows this lookup to be done with an indexed search rather than a linear search, thus making it efficient enough to use the same algorithm regardless of the stride of the reference group.

When the second walk has been completed, any references which have not been marked as trailing references are determined to be leading references: there is no multiple of the stride that causes them to access the same memory as another reference. Each leading reference has a list of its trailing references, which will be used during prefetch insertion (described below).

The references are then analyzed, one reference group at a time, for any potential cache conflicts (see block 258). The idea behind the cache conflict analysis is that even though the exact addresses that will be used by a reference group are not known, the relative addresses are known. From the relative offsets used for reuse analysis, the conflict analysis computes a new set of offsets called cache offsets. The cache offset for a given reference is its relative offset within its reference group modulo the cache set size. Cache conflicts can be modeled by inserting all the references into a model of the cache, and checking how many references fall into the same cache line but have different sets. If the number of sets required is larger than the available associativity, a conflict will occur.

More specifically, cache conflict analysis is performed iteratively. First, all the references in a reference group are checked for cache conflicts that may be present even without prefetching. Then, greater and greater prefetch distances are checked until either the maximum desirable prefetch distance is reached or a conflict is found. Each reference is then "labeled" with the maximum non-conflicting prefetch distance found.

The manner in which cache conflict analysis is implemented relies on B-trees. Rather than directly sorting the references, the references are inserted into a B-tree indexed by cache offset. The cache-offset B-tree is "walked" in order of increasing cache offsets. Each cache offset in turn is inspected for cache conflicts. To check a cache offset for conflicts, the set of all references that might share that offset must be constructed. The number of distinct cache lines required for all those references is calculated, and if the number of lines is greater than the associativity of the cache there is a conflict. For a given cache offset, the references with exactly that cache offset are inserted into a list. Then all the references with a cache offset that falls within one cache line (forward or backward) of the cache offset being checked are inserted into the list. Each time a reference is to be added to the list, it is added only if there is not already a reference with an offset within one bank-size of the reference to be added (references within one bank-size will share the same cache line). In the end, the number of entries on the list is the associativity required for the cache to hold all the references.

The analysis described so far checks for cache conflicts among the references that were originally in the code. The next step is to check whether adding a prefetch would cause cache conflicts. The analysis described above is continued, adding, to the list the references with cache offsets within one cache line of where the prefetches would fall. Prefetching one cache line ahead either adds one cache line to the cache offset (when the stride is less than a cache line) or adds a multiple of the stride. Prefetch distances from zero lines ahead to the maximum number of in-flight parallel memory operations are checked, and the largest distance with no conflicts is saved for each reference group.

For a program executed in system 10, insertion of prefetch instructions is performed to keep the memory system fully utilized. This is in strong contrast to previous approaches, which use prefetch instructions to hide memory latency. Each prefetch instruction has a distance (typically in bytes) ahead of the leading reference with which it is associated. In prior art, the distance is calculated so that the prefetch will complete before the leading reference needs the data. The distance is calculated by determining how long it takes to execute one iteration of the loop. If the memory latency is longer, the prefetch iteration distance is the number of iterations that take just longer than the memory latency time. In the prior art, the prefetch distance for a reference being prefetched is the stride of the reference times the prefetch iteration distance. This effectively hides the latency of the memory, because the data will be in the cache when it is needed.

We have discovered that this prior art approach to prefetch distance calculation does not yield the best performance. Memory latency is only half the problem: memory bandwidth is also important. The target processor can support some finite number of memory operations in-flight (i.e., executing) simultaneously. For example the Alpha 21264™ microprocessor supports up to eight simultaneously executing off-chip references. It is advantageous to have close to the maximum number of simultaneously-executing off-chip references actually executing simultaneously. If there are too many off-chip references in-flight at one time, processor resources are consumed retrying surplus references. The memory system is still at peak usage. The resources the processor uses to track references eventually fill, and the processor will stall until some memory operations complete. If there are too few memory operations in flight simultaneously, the memory system will not be able to take full advantage of parallel requests. In the present invention, to achieve maximum memory bandwidth, the prefetch analysis process 208 calculates prefetch distances so as to keep memory system utilization high while minimizing processor stalling.

A target machine model 80 supplies the maximum amount of in-flight memory references that can be executed simultaneously by the target processor. Each in-flight memory reference corresponds to a cache line that is to be moved from memory into the cache, or moved from the cache back into memory. The prefetch analysis phase 208 matches the resources required by the loop to the available target processor memory resources by adjusting the prefetch distances (see block 266). First, the total demand for memory bandwidth is calculated: each reference group contributes a demand equal to the number of leading references in that group times the maximum possible prefetch distance for that group. Each reference group gets a pro-rata share of the available number of in-flight references based on its demand. If the total demand is less than the available resources, each leading reference is prefetched a distance ahead of the leading reference equal to the maximum prefetch distance in cache lines for that reference times the cache line size. If the demand for memory resources exceeds the available processor resources, each reference group gets a pro rata share of the available resource based on its demand. The prefetch distance is then the cache line size times its share of the available band-width.

Each reference is prefetched at least some minimum number of lines ahead supplied by the target processor model. This ensures that the prefetches will be an adequate distance ahead even if there is high demand for memory bandwidth.

The cache conflict model cannot predict interactions between different reference groups. If there are many references groups, there is almost certain to be a cache conflict. This can be seen from the well-known "birthday problem" in probability theory: what are the odds that in a collection of individuals of size n, more than m different individuals share a birthday in a year with i days? In this case, the question is: in a collection of reference groups of size n using a cache memory with associativity m where each associative cache bank has i different cache lines, what is the probability that there is a cache conflict? To handle this, if the number of reference streams exceeds a threshold number supplied by the target processor model, all prefetching is abandoned.

For example, for the Alpha 21264™ microprocessor, the target processor model has an available prefetch bandwidth of eight in-flight memory operations. This means that if there is only one reference in a loop, the compiler will insert prefetches eight cache lines ahead. If there are two leading references, the compiler will prefetch each a distance of four cache lines ahead. If there are four references, each would be prefetched two lines ahead. Further alternatively, if there are eight references, the compiler would still prefetch two cache lines ahead, because the minimum distance for that target processor is two lines. However, if there are fifteen leading references, that would be above the cut-off threshold, and no references would be prefetched. Also, three equivalently-strided reference streams are prefetched three cache blocks ahead. If there are three reference streams, and cache conflict analysis has determined that two of the streams have a maximum distance of two lines, but the other has a maximum distance of four lines or more, then each of the two two-line streams is prefetched two line-widths ahead, but the third stream is prefetched four line-widths ahead.

An intermediate-language representation of prefetch instructions is inserted in accordance with these prefetch distance calculations during the loop unrolling process (see block 268). This allows the unroller to remove redundant prefetches. As the unroller copies the loop body, it inserts a prefetch for each leading reference as the leading reference is copied. Some copies of the prefetches are redundant, and can be eliminated following the teachings of the aforesaid Santhanam patent.

If the stride is large, prefetching just the leading reference may not be sufficient to ensure that all references are prefetched, due to cache alignment issues. As an example, imagine two references are less than one cache line apart, and there is a stride of two cache lines. Depending upon alignment, both references may be in the same cache line, but it may be likely that the leading reference will be associated with a different cache line from that with which the trailing reference is associated. In such cases, in order to make sure that the trailing reference is not cache miss, a prefetch instruction may also have to be inserted for it, in accordance with the following procedure.

The reuse analysis phase described the process of marking each leading reference with a list of trailing references. The leading reference is always prefetched. The list of trailing references is examined, and some trailing references should be prefetched. The most trailing reference that is not more than a full cache line behind the leading reference is prefetched. This new reference establishes a new baseline, and the next most trailing reference not more than one full cache line behind it is prefetched, and so forth, until the list of trailers is exhausted. This guarantees that every cache line that might be accessed in one iteration is prefetched, regardless of the alignment of the data in the cache.

The foregoing description has been directed to specific embodiments of the present invention. It will be apparent, however, that other alternatives, variations and modifications may be made to the described embodiments, with the attainment of some or all of their advantages. Therefore, it is intended that the present invention be viewed as being of broad scope and as covering all such alternatives, modifications, and variations. Thus, it is intended that the present invention be defined only as set forth in the hereinafter appended claims.

What is claimed is:

1. A computerized system that, at compile-time, converts a first set of computer program instructions of a relatively higher level program instruction language into a second set of computer program instructions of a relatively lower level program instruction language, the system comprising:

means for making a determination whether to insert a proposed memory prefetch instruction into a location in the second set of computer program instructions;

means for deciding whether insertion of the proposed prefetch instruction at the location is more likely than not to cause an undesired cache memory conflict if the pro-posed prefetch instruction were to be inserted; and means, responsive to the deciding means, for one of inserting and not inserting the proposed prefetch instruction.

2. A system according to claim 1, wherein:

the process also performs a program loop unrolling operation.

3. A system according to claim 1, wherein:

the determination is also made based upon whether the insertion of the prefetch instruction at the location is likely to permit an undesirably large number of memory operations to be contemporaneously executing.

4. A system according to claim 3, wherein:

the undesirably large number is based upon a maximum number of memory operations that can be contemporaneously executed by a processor.

5. A system according to claim 3, wherein:

a prefetch distance is used to calculate a total demand for memory bandwidth which is compared to available memory resources when determining whether insertion of a prefetch instruction would permit an undesirably large number of memory operations to be contemporaneously executing.

6. A system according to claim 1, wherein:

the relatively lower level program instruction language is a machine-independent language.

7. A system according to claim 5, further comprising:

a machine code generation process that converts the second set of program instructions into program code that is executable by a target processor.

8. A system according to claim 1, wherein the determination is based upon:

analyzing the references for cache conflicts based on one of an order of relative offsets and a sort of the references according to offsets of the references modulo cache set size.

9. A system according to claim 1, wherein:

said determination of whether insertion of a proposed memory prefetch instruction is more likely than not to cause an undesired cache memory conflict is based on calculation of a prefetch distance and the logical layout of available cache memory.

10. A system according to claim 9, wherein:

said logical layout of available cache memory includes set-associativity, number of cache lines and cache line size.

11. A computerized system that, at compile-time, inserts at least one memory prefetch instruction at a location in a set of computer program instructions, the system comprising:

a process resident in said system that makes a determination whether to insert the at least one prefetch instruction at the location based at least upon whether insertion of the prefetch instruction at the location is likely to permit an undesirably large number of memory operations to be contemporaneously executing.

12. A system according to claim 11, wherein:

the process also performs a program loop unrolling operation.

13. A system according to claim 11, wherein:

the undesirably large number is based upon a maximum number of memory operations that can be contemporaneously executed by a processor.

14. A system according to claim 11, further comprising:

a machine code generation process that converts the set of program instructions into program code that is executable by a target processor.

15. A system according to claim 11, wherein:

a prefetch distance is used to calculate a total demand for memory bandwidth which is compared to available memory resources when determining whether insertion of a prefetch instruction would permit an undesirably large number of memory operations to be contemporaneously executing.

16. A computerized method for converting, at compile-time, a first set of computer program instructions of a relatively higher level program instruction language into a second set of computer program instructions of a relatively lower level program instruction language, the method comprising:

determining whether to insert a memory prefetch instruction into a location in the second set of computer program instructions, based at least upon whether insertion of the prefetch instruction at the location is likely to cause an undesired cache memory conflict if the prefetch instruction were to be executed.

17. A method according to claim 16, wherein:

performing a program loop unrolling operation.

18. A method according to claim 16, wherein:

determination of whether to insert the prefetch instruction at the location is also made based upon whether the insertion of the prefetch instruction at the location is likely to permit an undesirable large number of memory operations to be contemporaneously executing.

19. A method according to claim 18, wherein:

the undesirably large number is based upon a maximum number of memory operations that can be contemporaneously executed by a processor.

20. A method according to claim 18, wherein:

a prefetch distance is used to calculate a total demand for memory bandwidth which is compared to available memory resources when determining whether insertion of a prefetch instruction would permit an undesirably large number of memory operations to be contemporaneously executing.

21. A method according to claim 16, wherein:

the relatively lower level program instruction language is a machine-independent language.

22. A method according to claim 21, further comprising:

converting the second set of program instructions into program code that is executable by a target processor.

23. A method according to claim 16, wherein:

said determination of whether insertion of a memory prefetch instruction is likely to cause an undesired cache memory conflict is based on calculation of a prefetch distance and the logical layout of available cache memory.

24. A method according to claim 23, wherein:

said logical layout of available cache memory includes set-associativity, number of cache lines and cache line size.

25. A computerized method for inserting at compile-time at least one memory prefetch instruction at a location in a set of computer program instructions, the method comprising:

determining whether to insert the at least one prefetch instruction at the location based at least upon whether insertion of the prefetch instruction is likely to cause an undesired cache memory conflict if the prefetch instruction were to be executed.

26. A method according to claim 25, wherein:

the determination is also made based upon whether the insertion of the prefetch instruction at the location is likely to permit an undesirably large number of memory operations to be contemporaneously executing.

27. A method according to claim 26, wherein:

the undesirably large number is based upon a maximum number of memory operations that can be contemporaneously executed by a processor.

28. A method according to claim 26, wherein:

a prefetch distance is used to calculate a total demand for memory bandwidth which is compared to available memory resources when determining whether insertion of a prefetch instruction would permit an undesirably large number of memory operations to be contemporaneously executing.

29. A method according to claim 25, further comprising:

converting the second set of program instructions into program code that is executable by a target processor.

30. A method according to claim 25, wherein:

said determination of whether insertion of a memory prefetch instruction is likely to cause an undesired cache memory conflict is based on calculation of a prefetch distance and the logical layout of available cache memory.

31. A method according to claim 30, wherein:

said logical layout of available cache memory includes set-associativity, number of cache lines and cache line size.

32. A computerized method for inserting at compile-time at least one memory prefetch instruction at a location in a set of computer program instructions, the method comprising:

determining whether to insert the at least one prefetch instruction at the location based at least upon whether insertion of the prefetch instruction at the location is likely to permit an undesirably large number of memory operations to be contemporaneously executing.

33. A method according to claim 32, wherein:

the undesirably large number is based upon a maximum number of memory operations that can be contemporaneously executed by a processor.

34. A method according to claim 32, further comprising: converting the second set of program instructions into program code that is executable by a target processor.

35. A method according to claim 32, wherein:

a prefetch distance is used to calculate a total demand for memory bandwidth which is compared to available memory resources when determining whether insertion of a prefetch instruction would permit an undesirably large number of memory operations to be contemporaneously executing.

36. Computer-readable memory comprising a first set of computer program instructions that when executed at compile-time converts a second set of computer program instructions of a relatively higher level program instruction language into a third set of computer program instructions of a relatively lower level program instruction language, the first set of computer program instructions comprising instructions that when executed:

makes a determination whether to insert a memory prefetch instruction into a location in the third set of computer program instructions, based at least upon whether insertion of the prefetch instruction at the location is likely to cause an undesired cache memory conflict if the prefetch instruction were to be executed.

37. Computer-readable memory according to claim 36, wherein:

the first set of instructions when executed also performs a program loop unrolling operation.

38. Computer-readable memory according to claim 36, wherein:

the determination is also made based upon whether the insertion of the prefetch instruction at the location is likely to permit an undesirably large number of memory operations to be contemporaneously executing.

39. Computer-readable memory according to claim 38, wherein:

the undesirably large number is based upon a maximum number of memory operations that can be contemporaneously executed by a processor.

40. Computer-readable memory according to claim 38, wherein:

a prefetch distance is used to calculate a total demand for memory bandwidth which is compared to available memory resources when determining whether insertion of a prefetch instruction would permit an undesirably large number of memory operations to be contemporaneously executing.

41. Computer-readable memory according to claim 36, wherein:

the relatively lower level program instruction language is a machine-independent language.

42. Computer-readable memory according to claim 41, further comprising:

machine code generation instructions that when executed convert the third set of program instructions into program code that is executable by a target processor.

43. Computer-readable memory according to claim 36, wherein:

said determination of whether insertion of a memory prefetch instruction is likely to cause an undesired cache memory conflict is based on calculation of a prefetch distance and the logical layout of available cache memory.

44. Computer-readable memory according to claim 43, wherein:

said logical layout of available cache memory includes set-associativity, number of cache lines and cache line size.

45. Computer-readable memory comprising a first set of computer program instructions that when executed at compile-time inserts at least one memory prefetch instruction at a location in a second set of computer program instructions, the first set of instructions comprising instructions that when executed:

makes a determination whether to insert the at least one prefetch instruction at the location based at least upon whether insertion of the prefetch instruction is likely to cause an undesired cache memory conflict if the prefetch instruction were to be executed.

46. Computer-readable memory according to claim 45, wherein:

the first set of instructions when executed also performs a program loop unrolling operation.

47. Computer-readable memory according to claim 45, wherein:

the first set of instructions when executed also makes the determination based upon whether the insertion of the prefetch instruction at the location is likely to permit an undesirably large number of memory operations to be contemporaneously executing.

48. Computer-readable memory according to claim 47, wherein:

the undesirably large number is based upon a maximum number of memory operations that can be contemporaneously executed by a processor.

49. Computer-readable memory according to claim 47, wherein:

a prefetch distance is used to calculate a total demand for memory bandwidth which is compared to available memory resources when determining whether insertion of a prefetch instruction would permit an undesirably large number of memory operations to be contemporaneously executing.

50. Computer-readable memory according to claim 45, further comprising:

machine code generation instructions that when executed convert the second set of program instructions into program code that is executable by a target processor.

51. Computer-readable memory according to claim 45, wherein:

said determination of whether insertion of a memory prefetch instruction is likely to cause an undesired cache memory conflict is based on calculation of a prefetch distance and the logical layout of available cache memory.

52. Computer-readable memory according to claim 51, wherein:

said logical layout of available cache memory includes set-associativity, number of cache lines and cache line size.

53. Computer-readable memory comprising a first set of computer program instructions that when executed at compile-time inserts at least one memory prefetch instruction at a location in a second set of computer program instructions, the first set of instructions comprising instructions that when executed:

makes a determination whether to insert the at least one prefetch instruction at the location based at least upon whether insertion of the prefetch instruction at the location is likely to permit an undesirably large number of memory operations to be contemporaneously executing.

54. Computer-readable memory according to claim 53, wherein:

the first set of instructions when executed also performs a program loop unrolling operation.

55. Computer-readable memory according to claim 53, wherein:

the undesirably large number is based upon a maximum number of memory operations that can be contemporaneously executed by a processor.

56. Computer-readable memory according to claim 53, further comprising:

machine code generation instructions that when executed convert the second set of program instructions into program code that is executable by a target processor.

57. Computer-readable memory according to claim 53, wherein:

a prefetch distance is used to calculate a total demand for memory bandwidth which is compared to available memory resources when determining whether insertion of a prefetch instruction would permit an undesirably large number of memory operations to be contemporaneously executing.

58. A computerized system that converts a first set of computer program instructions of a relatively higher level program instruction language into a second set of computer program instructions of a relatively lower level program instruction language, the system comprising:

a process resident in said system that performs a cache memory reuse analysis that includes sorting array memory references in at least one of the sets of instructions based upon relative offsets of said references, said sorting being carried out using a B-tree in which each of said references is inserted.

59. A computerized system that inserts at least one memory prefetch instruction at a location in a set of computer program instructions, the system comprising:

a process resident in said system that makes a determination whether to insert the at least one prefetch instruction at the location based at least upon a prefetch distance, in terms of cache memory lines, associated with the location.

60. A computerized method for converting a first set of computer program instructions of a relatively higher level program instruction language into a second set of computer program instructions of a relatively lower level program instruction language, the method comprising:

performing a cache memory reuse analysis that includes sorting array memory references in at least one of the sets of instructions based upon relative offsets of said references, said sorting being carried out using a B-tree in which each of said references is inserted.

61. A computerized method for inserting at least one memory prefetch instruction at a location in a set of computer program instructions, the method comprising:

determining whether to insert the at least one prefetch instruction at the location based at least upon a prefetch distance in terms of cache memory lines, associated with the location.

62. Computer-readable memory comprising first program instructions that when executed convert one set of computer program instructions of a relatively higher level program instruction language in to another set of computer program instructions of a relatively lower level program instruction language, the first program instructions when executed:

performing a cache memory reuse analysis that includes sorting array memory references in at least one of the one and another sets of instructions based upon relative offsets of said references, said sorting being carried out using a B-tree in which each of said references is inserted.

63. Computer-readable memory comprising first program instructions that when executed inserts at least one memory prefetch instruction at a location in a set of computer program instructions, the first program instructions when executed:

determining whether to insert the at least one prefetch instruction at the location based at least upon a prefetch distance in terms of cache memory lines, associated with the location.

\* \* \* \* \*